(12) United States Patent
Lukich

(10) Patent No.: US 6,305,358 B1
(45) Date of Patent: Oct. 23, 2001

(54) METHOD AND APPARATUS FOR DYNAMIC TRIMMING OF FUEL SYSTEM

(75) Inventor: Michael S. Lukich, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/469,111

(22) Filed: Dec. 21, 1999

Related U.S. Application Data

(60) Provisional application No. 60/113,346, filed on Dec. 21, 1998.

(51) Int. Cl.[7] ................................................ F02M 37/04
(52) U.S. Cl. ................................... 123/502; 123/480
(58) Field of Search ....................... 123/500, 502, 123/457, 478, 480, 501, 357

(56) References Cited

U.S. PATENT DOCUMENTS

| | | | |
|---|---|---|---|
| 4,476,832 | * 10/1984 | Fujimori et al. ............... | 123/502 |
| 4,503,830 | * 3/1985 | Nakamura et al. ............. | 123/501 |
| 5,188,084 | * 2/1993 | Sekiguchi ...................... | 123/502 |
| 5,357,912 | 10/1994 | Barnes et al. ................. | 123/357 |
| 5,359,883 | 11/1994 | Baldwin et al. ................ | 123/425 |
| 5,445,129 | 8/1995 | Barnes .......................... | 123/446 |
| 5,634,448 | 6/1997 | Shinogle et al. .............. | 123/480 |

* cited by examiner

Primary Examiner—Henry C. Yuen
Assistant Examiner—Mahmoud Gimie
(74) Attorney, Agent, or Firm—W. Bryan McPherson, III

(57) ABSTRACT

With reference to the drawings and in operation, the present invention is adapted to provide a method and apparatus for dynamically controlling the injection timing of a fuel injector connected to a fuel system located within an engine. The method includes the steps of establishing a desired injection timing of the injector 104 and determining an fuel injection command delivery time in response to the desired injection timing, and responsively delivering the fuel injection command. The actual injection timing is determined, and then the injection command delivery time is modified in response to comparing the actual and the desired injection timing. Comparing the actual and desired injection timing provides for closed loop control of the injection timing of the fuel system 102.

14 Claims, 4 Drawing Sheets

Fig_2_

METHOD AND APPARATUS FOR DYNAMIC TRIMMING OF FUEL SYSTEM

This application claims the benefit of prior provisional patent application Ser. No. 60/113,346 filed Dec. 21, 1998.

TECHNICAL FIELD

The present invention relates generally to a fuel injector connected to an engine, and more particularly, to a method and apparatus for determining an injection timing for a fuel injector connected to an engine.

BACKGROUND ART

The fuel quantity that is delivered to an internal combustion engine, and the timing for the delivery fuel, may be determined by a controller. The controller, i.e., a software program executing within the controller, will determine the time and amount of fuel to be delivered to each injector. The controller then sends the fuel command to the solenoid associated with the appropriate fuel injector and the fuel is delivered. In typical fuel systems, the start of injection for each injector is the same. However, due to variances between each fuel injector, the same start of injection command does not result in the injection beginning at the same time. In addition, the correlation between the start of injection and the desired crank angle position may not be the same for each injector. Therefore the placement of the injection event, or start of injection, at a prescribed crank angle position, such as top dead center, is inaccurate.

The present invention is directed to overcoming one or more of the problems set forth above.

DISCLOSURE OF THE INVENTION

In one aspect of the present invention, a method for controlling the injection timing for a fuel injector connected to a fuel system within an engine is disclosed. The method includes the steps of establishing a desired injection timing of the injector, determining an actual injection timing of the injector, and modifying an injection command delivery time in response to the desired injection timing and the actual injection timing.

In another aspect of the present invention an apparatus for controlling an injection timing for a fuel injector connected to an engine having a fuel system is disclosed. The apparatus includes a speed sensor for sensing a speed of the engine, a pressure sensor for sensing a pressure of the actuating fluid, and a controller adapted to determine an actual injection timing, compare the actual injection timing to a desired injection timing, and responsively modify a fuel injection command delivery time.

BEST MODE FOR CARRYING OUT THE INVENTION

Figure 1:
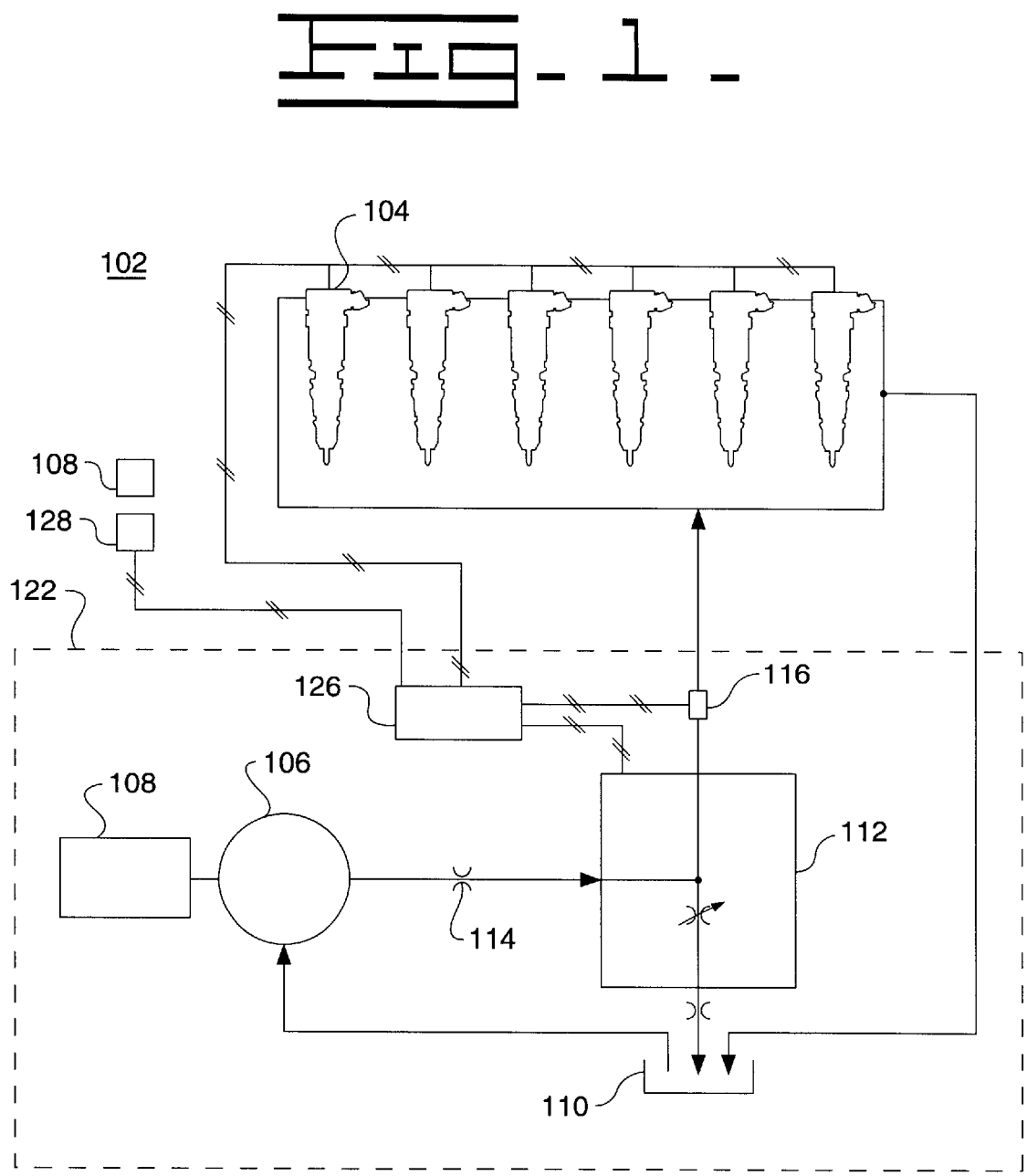
FIG. 1 illustrates one embodiment of a fuel system.

The present invention provides an apparatus and method for closed loop control of the injection timing of a fuel injector. FIG. 1 is an illustration of one embodiment of a fuel system 102 of an engine. In the preferred embodiment, the fuel system 102 is located within a mobile machine, such as an earth moving machine, automobile, or truck. The fuel system 102 includes at least one hydraulically-actuated electronically-controlled injector (HEUI) 104 for each combustion chamber or cylinder (not shown) of the fuel system 102.

The fuel system 102 also includes a circuit 122 for supplying hydraulically-actuating fluid to each injector 104. In one embodiment the circuit 122 includes a pump 106, driven by an internal combustion engine 108. The output of the pump 106 is connected to each fuel injector 104 and also to a fluid sump (or tank) 110. Each injector 104 is also connected to the fluid sump 110 in order to deliver the fluid received from the pump side, to the sump 110. In the preferred embodiment, the pump 106 is a fixed displacement pump. Alternatively, a variable displacement pump may be used.

The circuit 122 includes a pressure sensor 116. In the preferred embodiment, the pressure sensor 116, is located between a pressure control valve 112, and the injectors 104.

In the preferred embodiment, actuating fluid used in the circuit 122 may be petroleum based oil. However, the fluid may be a synthetic oil or a fuel, or other type of non-compressible fluid.

The circuit 122 includes a pressure control valve 112 for regulating how much actuating fluid flows to the injectors 104 as opposed to the fluid sump 110.

By adjusting how much of the actuating fluid flow provided by the pump 106 goes to the injectors 104 as compared to the sump 110, the pressure of the fluid supplied to the injectors 104 may be regulated. The pressure sensor 116 senses the pressure of the fluid flowing to the injectors 104 and provides feedback to an electronic controller 126. The electronic controller 126 compares a desired pressure to an actual pressure to form a closed loop system for maintaining pressure. For example, if the sensed fluid pressure exceeds the desired pressure the electronic controller 126 commands the pressure control valve 112 through an electronic signal, to increase the amount of fluid flow to the sump 110 thereby bringing the injector pressure down to the desired level.

The circuit 122 includes a speed sensing device 128 that senses an actual speed of the engine 130 and responsively delivers an actual engine speed signal to the controller 122. In the preferred embodiment, the speed sensing device 128 is a device sensitive to the passing of gear teeth by a magnetic pickup mounted to the engine 130, as is well known in the art. In one embodiment, the sensing device 128 is able to sense the position of the crank shaft of the engine. For example, one gear tooth may be monitored relative to top dead center. Therefore, as the crank shaft rotates, the angle of the crank shaft relative to top dead center may be sensed.

The circuit 122 includes an electronic controller 126. The controller 126 determines and controls the injection timing of the fuel system 102. In one embodiment, the controller 126 receives the speed signal and the pressure signal. The controller 126 determines an actual injection timing in response to the speed and pressure signal. The controller then compares the actual injection timing and a desired injection timing and responsively modifies the delivery time of a fuel injection command to the injector. In the preferred embodiment, the controller 126 is a programmable electronic control module capable of delivering a fuel injection command signal to the solenoid (not shown) of the injector 104. The controller 126, via the fuel injection command, controls the injection timing, including the start of injection, and the duration of injection of the injectors 104.

Figure 2:
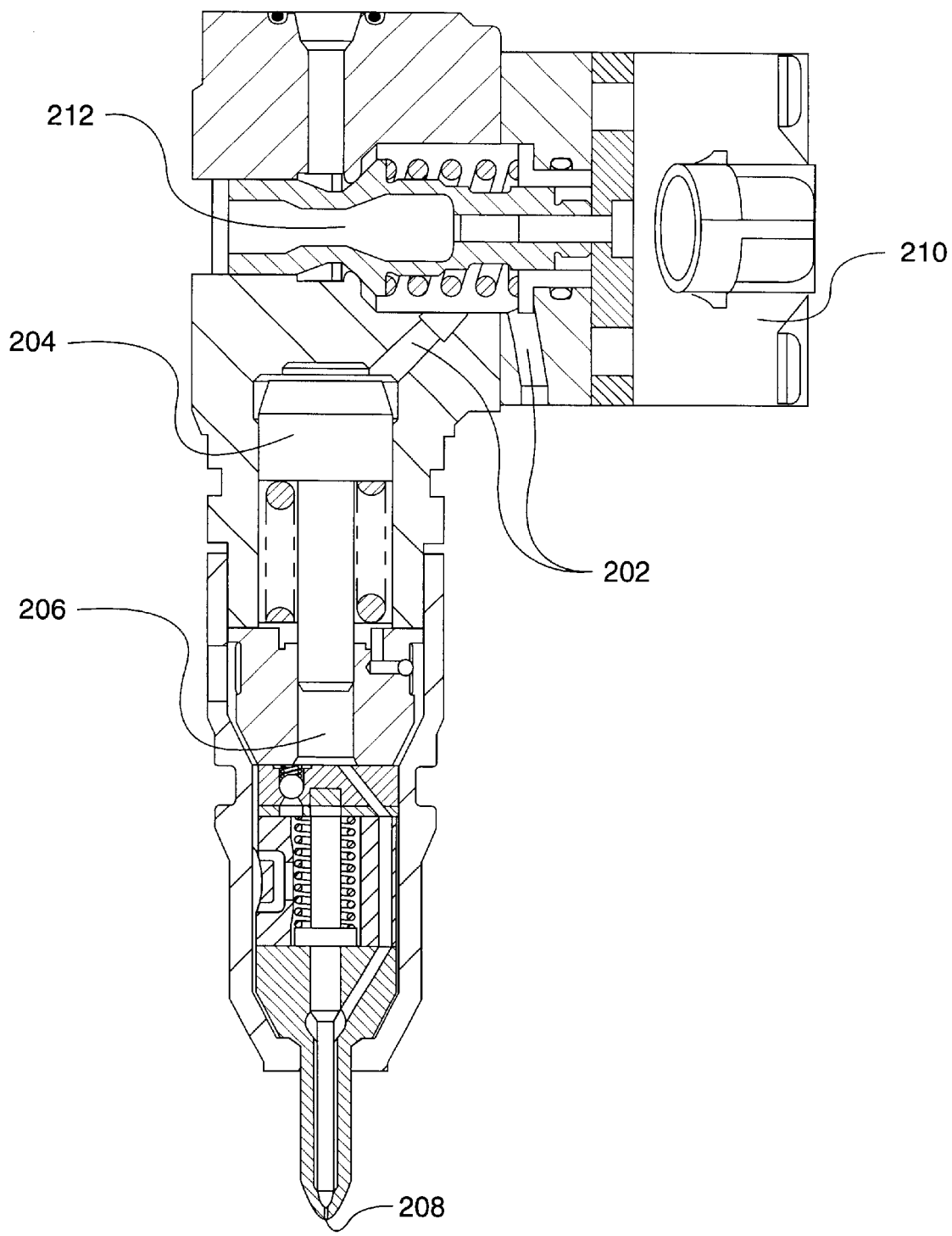
FIG. 2 illustrates one embodiment of a fuel injector.

FIG. 2 is an illustration of one embodiment of a hydraulically-actuated electronically controlled unit injector (HEUI). In a fuel system having a HEUI injector, high pressure hydraulic actuating fluid flows into a chamber 202, located within the injector 104, and pushes down on a plunger 204 which pushes fuel out from a plunger cavity 206, and out the injector through a nozzle 208. A solenoid 210, located within the injector 104, controls when the high pressure actuating fluid is exposed to the plunger 204 by moving a poppet valve 212. Therefore the amount of fuel injected is controlled by controlling the start time, duration, and end time the solenoid 210 is on, or energized. The solenoid 210 is controlled by the fuel injection command, generated by the controller 126.

The present invention includes a method for controlling the injection timing of a fuel injector 104. The method includes the steps of establishing a desired injection timing of the injector 104, determining an fuel injection command delivery time in response to the desired injection timing, and responsively delivering the fuel injection command. The actual injection timing is determined, and then the injection command delivery time is modified in response to comparing the actual and the desired injection timing. Comparing the actual and desired injection timing provides for closed loop control of the injection timing of the fuel system 102.

Figure 3:
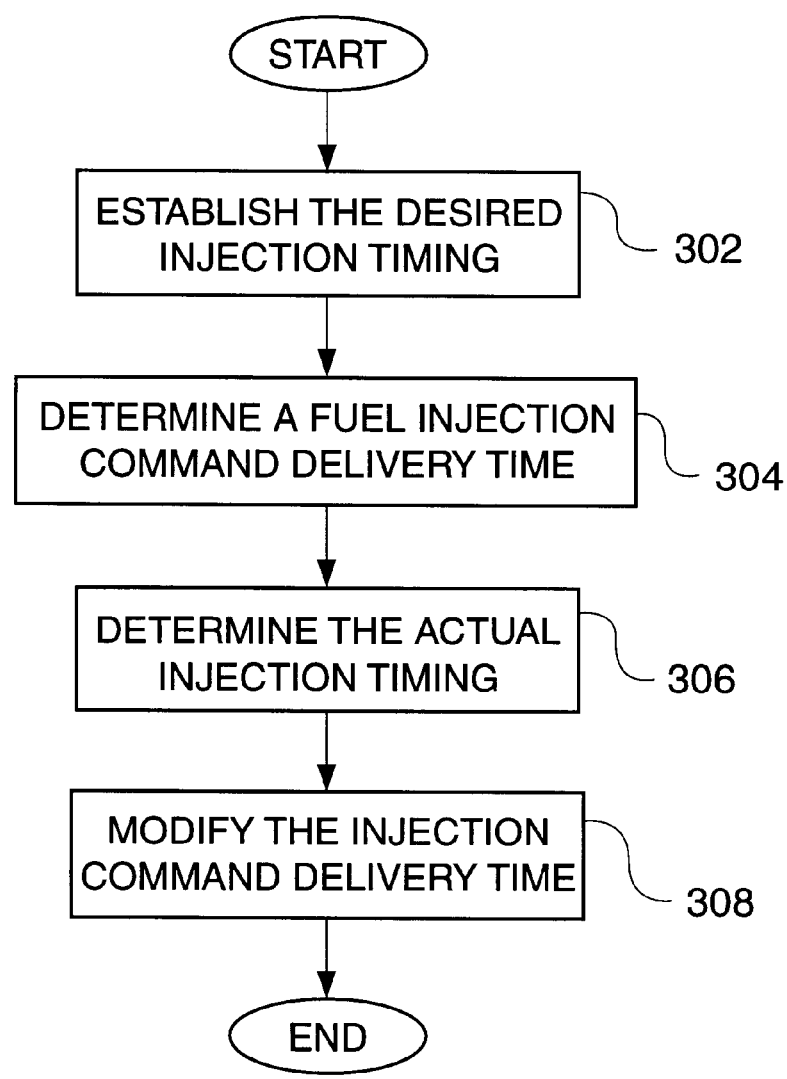
FIG. 3 illustrates a flow diagram of a method for controlling the injection timing for a fuel injector.

FIG. 3 illustrates a flow diagram of the method of the present invention. In a first control block 302 the desired injection timing is established. The desired injection timing may be established by selecting a desired injection timing, or dynamically determining a desired injection timing.

In one embodiment the engine may be a four stroke, or cycle, engine having an intake stroke, a compression stroke, a power stroke, and an exhaust stroke. In operation, the crankshaft of the engine (not shown) rotates when the engine is being operated. The rotation of the crankshaft results in the piston(s) (not shown) of the engine moving between a top dead center position and a bottom dead center position through the four strokes of the engine. In the preferred embodiment, the speed sensor 128 monitors the rotational position of the crankshaft and sends a signal to the controller 126. The controller 126 interprets the signal and at a determined time, i.e., the fuel injection command delivery time, sends the injection command signal to the fuel injector 104 of the appropriate piston, to inject the fuel into the cylinder (not shown) of the piston. In one embodiment, fuel injection is desired at a particular piston position to obtain effective cylinder firing. Therefore, in one embodiment the piston position is monitored in order to determine when to inject the fuel into the cylinder. In the preferred embodiment, the piston position may be correlated with the crank angle position. Therefore, by monitoring the crank angle position, the piston position may be determined. In one embodiment, the determination of the fuel injection command delivery time is based on the crank angle position.

In the preferred embodiment, the desired injection timing includes the desired crank angle position at which time the fuel should be injected into the cylinder. The desired crank angle position may be predetermined through empirical analysis of the engine performance. For example, the timing of injection of fuel into a cylinder may be varied with respect to crank angle position to determine an effective cylinder firing. The fuel injection timing with respect to crank angle position may be stored and later used during the operation of the engine. Alternatively the desired fuel injection timing may be dynamically determined in response to the current operating conditions of the engine. The operating conditions may include the actuating fluid pressure, engine speed, and actuating fluid temperature, and viscosity of the fluid.

In a second control block 304 an injection command delivery time is determined in response to the desired injection timing. For example, the time the injection command is to be delivered may be determined in an effort to inject fuel when the proper crank angle position occurs. The fuel injection command is then delivered to the injector 104.

Figure 4:
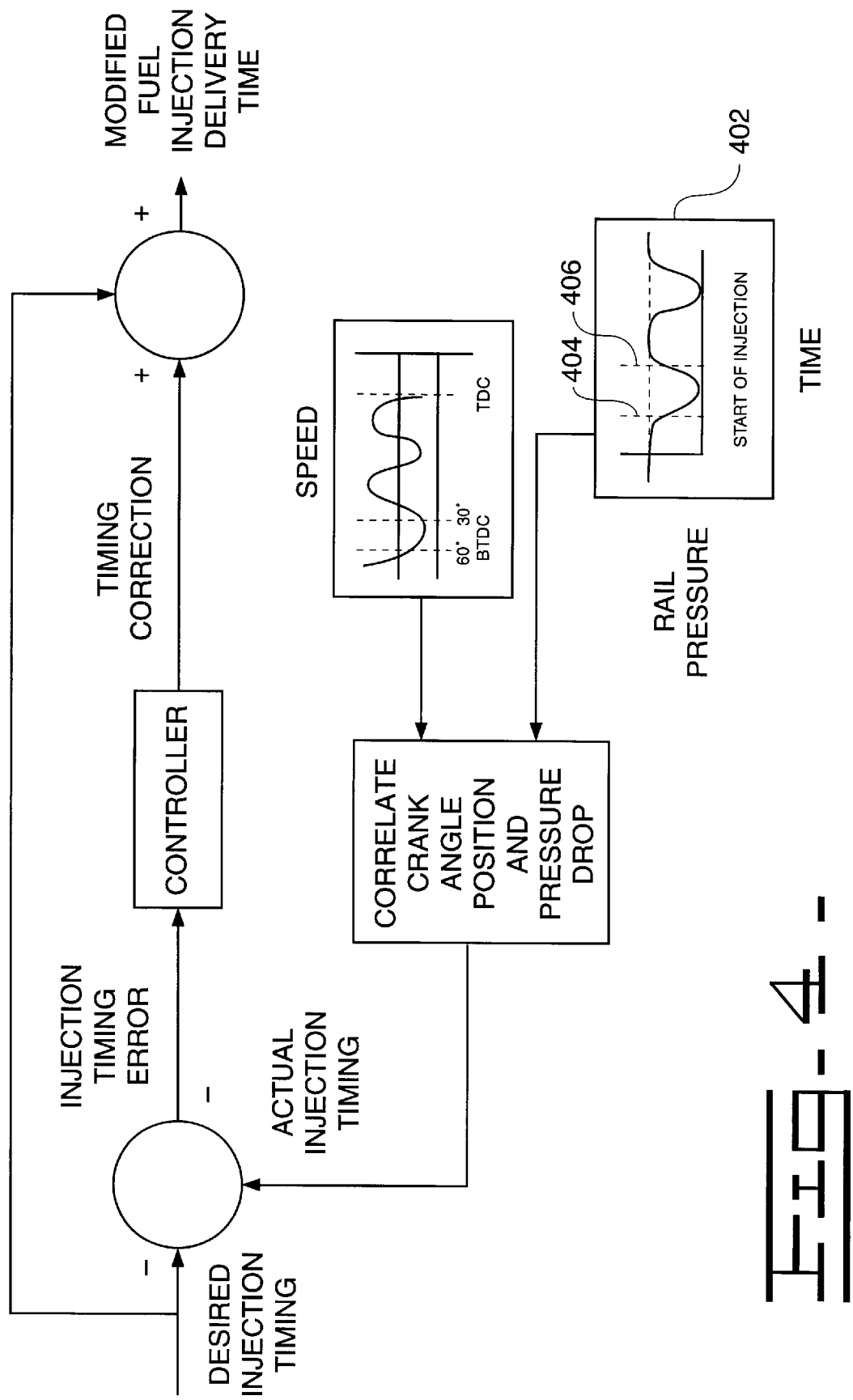
FIG. 4 illustrates a software block diagram of the present invention.

In a third control block 306 the actual injection timing is determined. In the preferred embodiment, the actual injection timing is determined by sensing the rail pressure of the actuating fluid throughout the engine cycles. In addition, the crank angle position is monitored during the injection cycle. The rail pressure and the crank angle position may then be correlated to determine the actual injection timing of the injector 104. The rail pressure of the actuating fluid may be determined by sensing the pressure drop of the fluid across a consistent orifice. The term consistent in this context means that the area of the orifice is fixed for a given condition, i.e., whenever the same condition occurs, the area of the orifice will be the same. In one embodiment, the rail pressure may be determined by measuring the pressure drop across the pressure control valve 112 of the circuit 102. The rail pressure may be mapped throughout the injection cycle, as a function of time, as illustrated in the map 402 illustrated in FIG. 4. FIG. 4 illustrates a software block diagram of one embodiment of the present invention. The actual injection timing includes a start of injection and an associated crank angle position. In one embodiment, the start of injection 404 may be identified as the time when the magnitude of the slope of the rail pressure as a function of time reaches a threshold value. The threshold value may be a predetermined value, or dynamically determined. The pressure drop is due, in part, to the fact that when the solenoid 210 is activated, the poppet valve 212 is manipulated to enable the actuating fluid to flow past the valve 212 and push down on a plunger 204. The plunger 204 then pushes fuel into a plunger cavity 206 and ultimately out the nozzle 208 of the injector 104. The rail pressure will begin to drop as the poppet valve 212 begins to enable the fluid to flow past the valve 212. When the slope of the rail pressure decreases after a being near zero, and the magnitude of the slope exceeds a predetermined threshold, then the start of injection may be determined to have occurred. The start of injection 404 is illustrated in the pressure map 402. The end of injection 406 may be identified as the time, after the pressure slope is positive, when the slope of the magnitude of the rail pressure drops below a threshold to near zero.

In an alternative embodiment, the start of injection 404 may be identified as the time when the rail pressure begins to decline below a threshold value. The end of injection 406 may be identified as the time when the rail pressure exceeds a second threshold value, indicating that the fluid has filled the chamber adjacent to the plunger 206, or the poppet valve 212 has closed.

In the preferred embodiment, the position of the crank angle is sensed throughout the injection cycle, as illustrated in the position map 408 of FIG. 4. The position map 408 illustrates the position of the crank angle relative to top dead center.

The timing of the actual start of injection is determined in response to the rail pressure and the crank angle position. The position of the crank angle during the injection cycle may be correlated with the corresponding actuating fluid rail pressure. Correlating the rail pressure with the crank angle position will indicate the location of the crank angle throughout the injection cycle. Therefore, the position of the crank angle at the start of injection may be determined. In one embodiment, the point where the pressure drops below a first threshold may be correlated with the position of the crank angle to determine the position of the crank angle at the start of injection.

In a fourth control block 308, injection command delivery time is modified in response to the desired injection timing and the actual injection timing. In the one embodiment, the desired crank angle position of the desired injection timing is compared with the actual crank angle position of the actual injection timing. An injection timing error is determined in response to comparing the actual and desired injection timing. An injection timing offset is determined in response to the timing error. The fuel injection command delivery time is then modified in response to the timing offset. Alternatively the desired injection timing is modified by the timing offset to determine the timing of the next fuel injection command. The fuel injection command is then delivered to the injector in response to the modified injection timing.

For example, if the desired crank angle position at the start of injection is 30 degrees before top dead center, and the actual start of injection, as determined by the rail pressure map, occurred at 60 degrees before top dead center, then the fuel injection command delivery time may be modified so that during the next injection cycle, the start of injection may occur at 30 degrees before top dead center.

In the preferred embodiment, if the fuel system has multiple HEUI injectors, a desired start of injection for each individual injector may be determined, as described, based on the characteristics of the individual injector 104.

In an alternative embodiment, an average start of injection timing error may be determined for the injectors as a group. The average start of injection timing error may be determined by averaging the injection timing error for each of the injectors 104. The average timing error may then be used to modify a desired injection timing that will be used for each injector. Therefore, one modified desired injection timing may be used for all the injectors.

The modified desired injection timing is then used to generate a fuel command which is delivered by the controller 126, to the solenoid 210 associated with each of the injectors. The fuel command thereby enables the injection of fuel by the injectors.

INDUSTRIAL APPLICABILITY

With reference to the drawings and in operation, the present invention is adapted to provide a method and apparatus for dynamically controlling the injection timing of a fuel injector connected to a fuel system located within an engine. The method includes the steps of establishing a desired injection timing of the injector 104 and determining an fuel injection command delivery time in response to the desired injection timing, and responsively delivering the fuel injection command. The actual injection timing is determined, and then the injection command delivery time is modified in response to comparing the actual and the desired injection timing. Comparing the actual and desired injection timing provides for closed loop control of the injection timing of the fuel system 102.

In operation the present invention will enable the start of injection for a injector to be accurately correlated with a desired crank angle position. In the preferred embodiment the fuel system will contain multiple injectors. The present invention will enable the start of injection for each injector to be accurately correlated with a prescribed crank angle position associated with that injector.

Other aspects, objects, advantages and uses of the present invention can be obtained from a study of the drawings, disclosures and appended claims.

What is claimed is:

1. A method configured to control the injection timing of a fuel injector connected to a fuel system within an engine, said fuel system having an actuating fluid, comprising the steps of:

establishing a desired injection timing of the injector;

determining a fuel injection command delivery time in response to said desired injection timing, and responsively delivering said injection command;

determining a pressure of said actuating fluid;

determining a piston position of a piston associated with the fuel injector, said piston being located within the engine;

determining an actual injection timing in response to said pressure and said piston position; and determining a subsequent fuel injection command delivery time in response to said actual injection timing.

2. A method configured to control the injection timing of a fuel injector connected to a fuel system within an engine, said fuel system having an actuating fluid, comprising the steps of:

establishing a desired injection timing of the injector;

determining a fuel injection command delivery time in response to said desired injection timing, and responsively delivering said injection command;

determining a rail pressure of said actuating fluid;

determining a crank angle position of an engine crank;

determining an actual injection timing in response to said rail pressure and said crank angle position; and determining a subsequent fuel injection command delivery time in response to said actual injection timing.

3. A method, as set forth in claim 2, further comprising the step of correlating said rail pressure with said crank angle position; and whereby the step of determining said actual injection timing includes the step of determining said actual injection timing in response to said correlation.

4. A method, as set forth in claim 3, wherein the step of determining said actual injection timing further comprises the step of determining an actual start of injection and an associated crank angle position in response to said correlation.

5. A method, as set forth in claim 4, wherein the step of determining said subsequent injection command delivery time further comprises the steps of comparing said actual start of injection with said desired start of injection.

6. A method, as set forth in claim 5, wherein said step of comparing said actual start of injection further comprises the step of comparing said actual start of injection crank angle position with a desired crank angle position.

7. A method, as set forth in claim 6 further comprising the steps of:

determining a crank angle position error in response to said comparison of said actual start of injection crank angle position and said desired crank angle position; and determining said subsequent injection command delivery time in response to said crank angle position error.

8. A method, as set forth in claim 7, further comprising the step of determining a timing correction in response to said crank angle position error.

9. A method, as set forth in claim 8, wherein the step of determining said subsequent injection command delivery further comprises the step of determining said subsequent injection command delivery time in response to said desired injection timing and said timing correction.

10. An apparatus for controlling an injection timing for a fuel injector connected to an engine having a fuel system, said fuel system having actuating fluid, comprising:

an speed sensor for sensing a speed of the engine and responsively generating a speed signal;

a pressure sensor for sensing a pressure of said actuating fluid and responsively generating a pressure signal; and a controller adapted to receive said speed signal and said pressure signal and responsively determine an actual injection timing, compare said actual injection timing to a desired injection timing, and responsively modify a fuel injection command delivery time.

11. An apparatus, as set forth in claim 10, wherein said controller is further adapted to determine a piston position of a piston associated with the fuel injector in response to said speed signal, and determine said actual injection timing in response to said piston position and said pressure signal.

12. An apparatus, as set forth in claim 10, wherein said controller is further adapted to determine a crank angle position in response to said speed signal, and determine said actual injection timing in response to said crank angle position and said pressure signal.

13. An apparatus, as set forth in claim 12, wherein said actual injection timing further comprises an actual start of injection and an associated crank angle position, and said desired injection timing further comprises a desired start of injection and a desired crank angle position.

14. An apparatus, as set forth in claim 13, wherein said controller is further adapted to correlate said pressure signal and said crank angle position and responsively determine an actual start of injection crank angle position, compare said actual start of injection crank angle position and said desired crank angle position, determine an injection command delivery time offset in response to said crank angle position comparison, and modify said injection command delivery time in response to said offset.

* * * * *